United States Patent
Kubo et al.

(10) Patent No.: US 10,148,850 B2
(45) Date of Patent: Dec. 4, 2018

(54) IMAGE PROCESSING APPARATUS, IMAGE PROCESSING METHOD, AND RECORDING MEDIUM

(71) Applicants: Shuko Kubo, Kanagawa (JP); Hidenori Shindoh, Tokyo (JP)

(72) Inventors: Shuko Kubo, Kanagawa (JP); Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/465,057

(22) Filed: Mar. 21, 2017

(65) Prior Publication Data

US 2017/0289389 A1 Oct. 5, 2017

(30) Foreign Application Priority Data

Mar. 29, 2016 (JP) ................................. 2016-065556

(51) Int. Cl.
  *H04N 1/38* (2006.01)
  *H04N 1/44* (2006.01)
  (Continued)

(52) U.S. Cl.
  CPC ....... *H04N 1/32251* (2013.01); *G06T 1/0021* (2013.01); *G06T 1/0028* (2013.01);
  (Continued)

(58) Field of Classification Search
  None
  See application file for complete search history.

(56) References Cited

U.S. PATENT DOCUMENTS 6,975,733 B1 * 12/2005 Choi .................... H04N 1/3217
  381/100
8,811,655 B2 * 8/2014 Petrovic ................ G06T 1/0028
  382/100

(Continued)

FOREIGN PATENT DOCUMENTS

CN 106485666 A 3/2017
EP 1 701 535 A1 9/2006
(Continued)

OTHER PUBLICATIONS

Extended European Search Report dated Jul. 21, 2017 in European Patent Application No. 17162057.8.

(Continued)

*Primary Examiner* — Madelein T Nguyen
(74) *Attorney, Agent, or Firm* — Oblon, McClelland, Maier & Neustadt, L.L.P.

(57) ABSTRACT

An image processing apparatus includes: an embed-data generating unit configured to generate embed-data, which is to be embedded in input-image-data, the input-image-data representing an image including a first color, the embed-data representing an image including a second color; an inverting unit configured to invert the image represented by the embed-data, in response to meeting a predetermined condition relating to the first color and the second color; and an output-image-data generating unit configured to embed, in the input-image-data, embed-data representing the image that is inverted by the inverting unit, in order to generate output-image-data in a case where the predetermined condition is met, and configured to embed, in the input-image-data, embed-data representing the image that is not inverted by the inverting unit, in order to generate output-image-data in a case where the predetermined condition is not met.

6 Claims, 8 Drawing Sheets

(51) Int. Cl.
*H04N 1/46* (2006.01)
*H04N 1/32* (2006.01)
*G06T 1/00* (2006.01)

(52) U.S. Cl.
CPC ..... *H04N 1/32144* (2013.01); *H04N 1/32149* (2013.01); *G06T 2201/005* (2013.01); *G06T 2201/0051* (2013.01); *G06T 2201/0061* (2013.01); *H04N 1/32203* (2013.01); *H04N 1/32229* (2013.01); *H04N 2201/3236* (2013.01)

(56) References Cited

U.S. PATENT DOCUMENTS

| | | | | |
|---|---|---|---|---|
| 9,819,946 | B2* | 11/2017 | Taubman | H04N 19/176 |
| 2002/0021824 | A1* | 2/2002 | Reed | G06K 7/1417 382/100 |
| 2002/0090110 | A1* | 7/2002 | Braudaway | G06T 1/005 382/100 |
| 2002/0164051 | A1* | 11/2002 | Reed | G06T 1/0028 382/100 |
| 2002/0164052 | A1* | 11/2002 | Reed | G06F 17/30876 382/100 |
| 2003/0012402 | A1* | 1/2003 | Ono | G06T 1/0064 382/100 |
| 2003/0231785 | A1* | 12/2003 | Rhoads | G06F 17/30876 382/100 |
| 2005/0018845 | A1* | 1/2005 | Suzaki | G06T 1/0028 380/243 |
| 2005/0259844 | A1* | 11/2005 | Kot | G06T 1/0028 382/100 |
| 2006/0008112 | A1* | 1/2006 | Reed | G06T 1/0028 382/100 |
| 2006/0236112 | A1* | 10/2006 | Maeno | H04N 1/32144 713/176 |
| 2006/0239503 | A1* | 10/2006 | Petrovic | H04L 9/002 382/100 |
| 2006/0256362 | A1 | 11/2006 | Guan et al. | |
| 2007/0005977 | A1* | 1/2007 | Tohne | H04N 1/32203 713/176 |
| 2007/0041608 | A1* | 2/2007 | Maeno | H04N 1/00838 382/100 |
| 2007/0079124 | A1* | 4/2007 | Maeno | G06T 1/005 713/176 |
| 2007/0092102 | A1* | 4/2007 | Kot | G06T 1/0028 382/100 |
| 2007/0115510 | A1* | 5/2007 | Braudaway | G06T 1/005 358/3.28 |
| 2007/0183626 | A1* | 8/2007 | Hashimoto | G06T 1/0028 382/100 |
| 2008/0180753 | A1* | 7/2008 | Maeno | G06F 21/608 358/3.28 |
| 2009/0010487 | A1* | 1/2009 | Maeno | G06T 1/0071 382/100 |
| 2009/0213397 | A1 | 8/2009 | Ishikawa et al. | |
| 2011/0007935 | A1* | 1/2011 | Reed | G06T 1/0028 382/100 |
| 2012/0002877 | A1* | 1/2012 | Takahashi | H04N 1/4486 382/195 |
| 2012/0014557 | A1 | 1/2012 | Reed et al. | |
| 2012/0020563 | A1* | 1/2012 | Amir | G06K 9/3266 382/182 |
| 2014/0037129 | A1* | 2/2014 | Reed | G06T 1/0021 382/100 |
| 2016/0048940 | A1 | 2/2016 | Reed et al. | |
| 2017/0024845 | A1* | 1/2017 | Filler | G06T 1/0028 |
| 2017/0289389 | A1* | 10/2017 | Kubo | H04N 1/32149 |

FOREIGN PATENT DOCUMENTS

| | | |
|---|---|---|
| EP | 2 093 992 A1 | 8/2009 |
| JP | 2006-303728 | 11/2006 |
| JP | 2008-236248 | 10/2008 |

OTHER PUBLICATIONS

Robin Rendle, "Reverse Text Color Based on Background Color Automatically in CSS", URL: https://css-tricks.com/reverse-text-color-mix-blend-mode, XP055389094, Oct. 19, 2015, pp. 1-13.

* cited by examiner

IMAGE PROCESSING APPARATUS, IMAGE PROCESSING METHOD, AND RECORDING MEDIUM

CROSS-REFERENCE TO RELATED APPLICATIONS

The present application claims the benefit of priority under 35 U.S.C. § 119 of Japanese Patent Application No. 2016-065556, filed Mar. 29, 2016, the contents of which are incorporated herein by reference in their entirety.

BACKGROUND OF THE INVENTION

1. Field of the Invention

The present disclosure relates to image processing apparatuses, image processing methods, and recording media.

2. Description of the Related Art

Conventionally, there has been a technique for embedding, to an image to be printed, another image that is a so-called "watermark".

For example, first, a watermark information embedding device detects pixel information of a document image. Then, the watermark information embedding device determines watermark density of watermark information that can be embedded in the document image based on the detected pixel information. Then, the watermark information embedding device generates watermark information to be embedded in the document image, according to the determined watermark density. Then, the watermark information embedding device embeds the generated watermark information in the document image. In such a way, according to a technique known in the art, watermark information may be embedded so that embedded information can be restored correctly, regardless of percentage of a character region in a document or image density of a background image, etc. (see, for example, Japanese Unexamined Patent Application Publication No. 2006-303728)

SUMMARY OF THE INVENTION

One aspect of the present invention provides an image processing apparatus including: an embed-data generating unit configured to generate embed-data, which is to be embedded in input-image-data, the input-image-data representing an image including a first color, the embed-data representing an image including a second color; an inverting unit configured to invert the image represented by the embed-data, in response to meeting a predetermined condition relating to the first color and the second color; and an output-image-data generating unit configured to embed, in the input-image-data, embed-data representing the image that is inverted by the inverting unit, in order to generate output-image-data in a case where the predetermined condition is met, and configured to embed, in the input-image-data, embed-data representing the image that is not inverted by the inverting unit, in order to generate output-image-data in a case where the predetermined condition is not met.

DESCRIPTION OF THE EMBODIMENTS

Due to the colors, etc., of a generated image, there are cases in which an additionally embedded image is overly perceptible; thus, due to the additionally embedded image, deterioration in image quality of the generated image becomes a problem.

An aspect of the present invention is to solve the above mentioned problem. An object of the present invention is to provide an image processing apparatus that is capable of forming, in an improved image quality, an image including an additionally embedded image.

An aspect of the present invention may provide an image processing apparatus that is capable of forming, in an improved image quality, an image including an additionally embedded image.

The following description explains embodiments of the present invention, with reference to drawings. An example of an image processing apparatus according to the embodiments of the present invention is a multifunction peripheral (MFP), etc. In the following explanation, an MFP is provided as an example of an image processing apparatus. Note that the image processing apparatus is not necessarily an MFP; the image processing apparatus may be another type of image processing apparatus.

<First Embodiment>

<Example of an Image Processing Apparatus>

Figure 1:
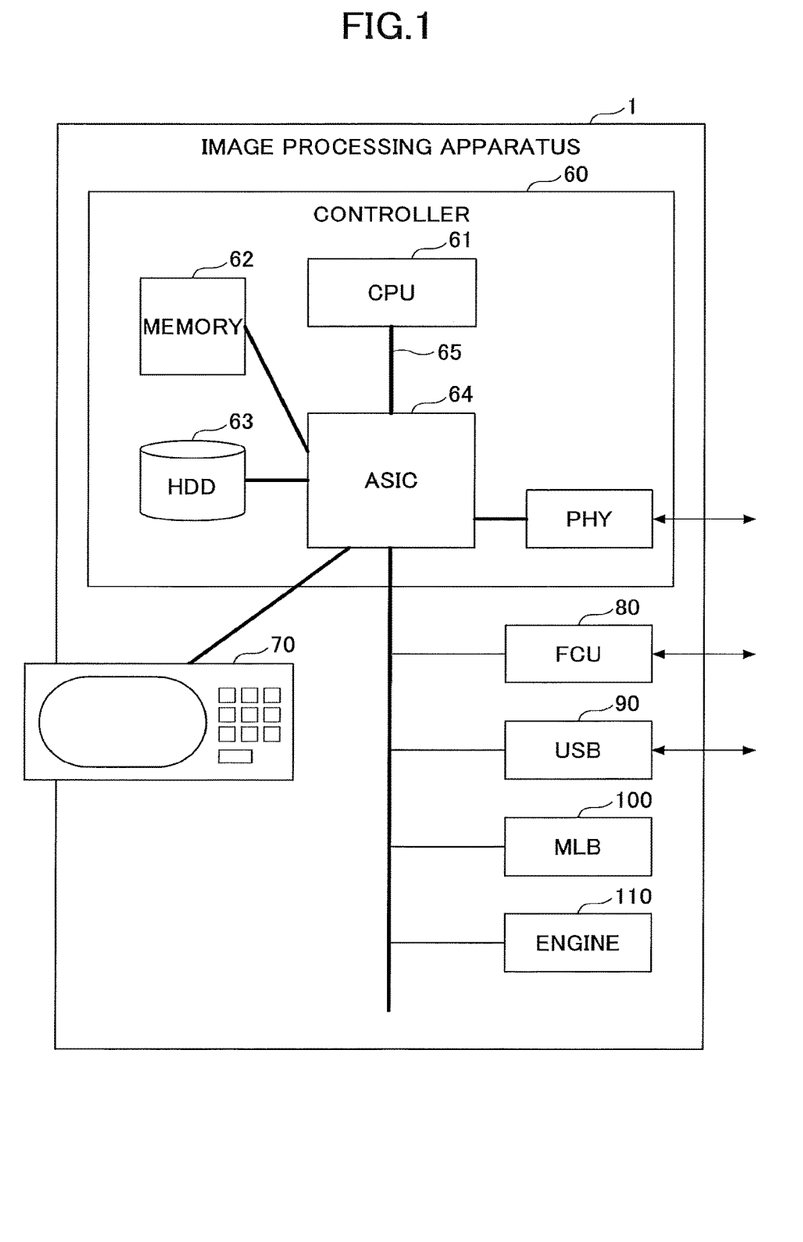
FIG. 1 is a block diagram illustrating an example of a hardware configuration of an image processing apparatus according to embodiments of the present invention.

FIG. 1 is a block diagram illustrating an example of a hardware configuration of an image processing apparatus according to the first embodiment of the present invention. For example, an MFP 1, which is an example of an image processing apparatus, includes a controller 60, an operation panel 70, which is an example of an input unit and output unit, a fax control unit (FCU) 80, and a universal serial bus (USB) 90. Furthermore, the MFP 1 includes a media link board (MLB) 100 and an engine 110.

Furthermore, the controller 60 includes a central processing unit (CPU) 61, a memory 62, a hard disk drive (HDD) 63, and an application specific integrated circuit (ASIC) 64.

Hardware of the MFP 1 is interconnected via a data-transfer bus 65.

The CPU 61 is an example of an arithmetic unit and a control unit. That is to say, the CPU 61 performs overall control of the MFP 1.

The memory 62 is an example of a main memory unit. That is to say, the memory 62 stores data, etc., utilized by the controller 60.

The HDD 63 is an example of an auxiliary memory unit. That is to say, the HDD 63 stores data, etc., utilized by the controller 60.

The ASIC 64 is an integrated circuit (IC) that performs image processing, communication (which is referred to as "PHY" in FIG. 1), control, etc.

The operation panel 70 inputs a user operation. Furthermore, the operation panel 70 outputs a processing result, etc., to a user.

The FCU 80 performs communication with an external device having a FAX, a modem, etc. Furthermore, the FCU 80 demodulates modulated data, etc., which is transmitted by the external device, and receives data, etc.

The USB 90 is an example of an interface for connecting an external device. That is to say, the USB 90 may be a connector, a cable, a processing IC, etc., for inputting/outputting data from/to a connected external device.

The MLB 100 is an electric circuit board, etc., for performing image processing such as image conversion.

The engine 110 forms an image on a sheet, etc., based on output image data.

Additionally, the CPU 61, etc., of the controller 60 executes programs, so that the MFP 1 performs a variety of processing. For example, programs are installed to the MFP 1, so that the MFP 1 has such a software configuration as follows.

Figure 2:
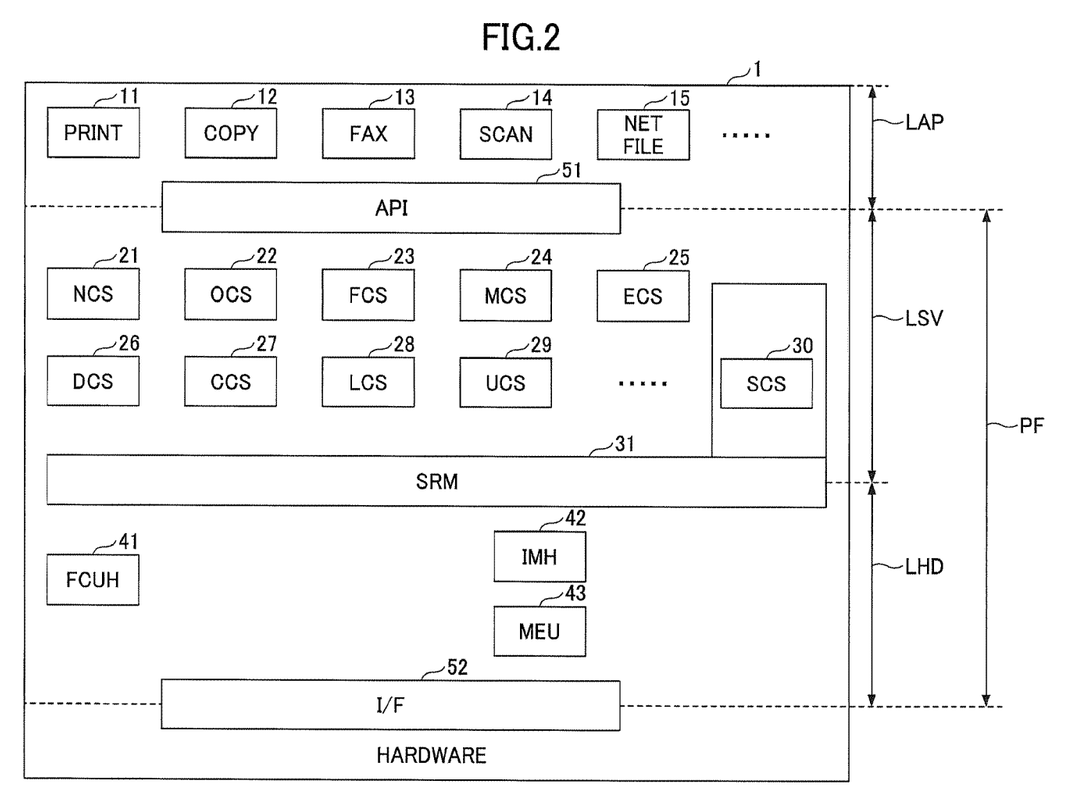
FIG. 2 is a block diagram illustrating an example of a software configuration of the image processing apparatus according to the embodiments of the present invention.

FIG. 2 is a block diagram illustrating an example of a software configuration of an image processing apparatus according to the embodiments of the present invention. For example, the MFP 1 executes installed programs, so as to configure an application layer LAP and a platform PF, as illustrated.

For example, as illustrated, programs relating to image processing are installed in the application layer LAP. In the illustrated example, application programs such as a PRINT (for printing) 11, a COPY (for copying) 12, a FAX (for facsimiling) 13, a SCAN (for scanning) 14 and a NET FILE (for net filing) 15 are installed in the MFP 1.

Furthermore, as illustrated, the platform PF is configured by a service layer LSV, a system resource manager (SRM) 31, a handler layer LHD, etc. Note that the service layer LSV provides a control service, which is to interpret a processing request obtained from the application layer LAP and to generate an acquisition request intended for corresponding parts of the hardware. Furthermore, the SRM 31 manages one or more parts of the hardware and arbitrates an acquisition request obtained from the service layer LSV. Furthermore, the handler layer LHD manages corresponding parts of the hardware, based on an acquisition request obtained from the SRM 31.

A network control service (NCS) 21, an operation panel control service (OCS) 22, a facsimile control service (FCS) 23, a memory control service (MCS) 24, an engine control service (ECS) 25, etc., are installed in the service layer LSV. Furthermore, a delivery control service (DCS) 26, a certification-and-charge control service (CCS) 27, a log control service (LCS) 28, a user-information control service (UCS) 29, etc., are installed in the service layer LSV. Furthermore, a system control service (SCS) 30, etc., is installed in the service layer LSV. As described above, the service layer LSV is constituted by service modules, etc.

The platform PF receives a processing request from the application layer LAP, based on a predefined function, i.e., an application programming interface (API) 51. Furthermore, software programs are run on an operation system (OS) to be executed. The OS executes software programs in the application layer LAP and the platform PF, as a process.

The process based on the NCS 21 is to provide a service intended generally for software programs that utilize a network input/output (I/O). For example, the process based on the NCS 21 is to sort data received from a network to each of software programs in accordance with respective protocols; and to mediate transmission of data from each of software programs to a network.

The process based on the OCS 22 is to control the operation panel 70 (see, FIG. 1), etc.

The process based on the FCS 23 is to provide, for the application layer LAP, APIs utilized for transmitting/receiving a facsimile via a public switched telephone network (PSTN) or an integrated services digital network (ISDN); for registering and referring to data relating to facsimiles that is stored in a backup memory, etc.; for scanning a facsimile; and for receiving and printing a facsimile, etc.

The process based on the MCS 24 is to control a recording medium (i.e. memory-control), which is to acquire a memory, to free a memory, to utilize a hard disk (HD), etc.

The process based on the ECS 25 is to control the engine 110, etc.

The process based on the DCS 26 is to control distribution of saved documents, etc.

The process based on the CCS 27 is to perform control relating to certification and charge.

The process based on the LCS 28 is to store and manage log data.

The process based on the UCS 29 is to manage data relating to users.

The process based on the SCS 30 is to manage applications; to control an input unit that is provided for a user to enter operations; to display a system screen; to light a light-emitting diode; to manage each part of the hardware; to control an interrupt application, etc.

Similarly to the SCS 30, the process based on the SRM 31 is to perform overall control of the apparatus; and to manage each part of the hardware. For example, the process based on the SRM 31 is to mediate an acquisition request for utilizing a plotter provided in the engine 110 or for utilizing a part of the hardware, in response to receiving an acquisition request from an upper layer such as the application layer.

Specifically, the process based on the SRM is to determine, in response to receiving an acquisition request, whether a hardware part corresponding to the acquisition request is available. Note that, for example, in a case that a corresponding hardware part is in use because of another acquisition request, the process based on the SRM 31 determines that the hardware is unavailable. Other than such a case, i.e., in a case that a corresponding hardware part is not in use, the hardware is determined to be available in the process based on the SRM 31. Furthermore, in the process based on the SRM 31, when a hardware part is available, a corresponding program in the upper layer is informed that the hardware part corresponding to the acquisition request is available.

Furthermore, the process based on the SRM 31 is to perform scheduling for utilizing a hardware part, based on an acquisition request obtained from the upper layer. Then, in the process based on the SRM 31, a requested item (e.g. conveyance of a sheet performed by the engine 110, operation for forming an image, allocation of a memory, and generation of a file) is executed.

A facsimile-control-unit handler (FCUH) 41, an image-memory handler (IMH) 42, a media edit utility (MEU) 43, etc., are installed in the handler layer LHD.

The process based on the FCUH 41 is to manage the FCU 80 (see, FIG. 1).

The process based on the IMH 42 is to allocate a memory for performing a process; and to manage a memory allocated for performing a process.

The process based on the MEU 43 is to perform control relating to digital watermarking and to image conversion.

The SRM 31 and the FCUH 41 transmit a processing request to a hardware part via an interface (I/F) 52, based on a predefined function, etc.

For example, in a case that the image processing apparatus is the MFP 1, a printer, etc., which performs image formation, an operation is as follows. First, a printing request is entered to the MFP 1 by a user of the MFP 1, for example, from a personal computer (PC) coupled with the MFP 1 via a printer driver. In such a case, the MFP 1 utilizes a printer application such as the PRINT 11 via the NCS 21. Then, the MFP 1 inputs printing data obtained from the PC, etc., from which the printing request has been entered.

Then, in response to a request from the PRINT 11, the MCS 24 of the MFP 1 acquires a memory. Furthermore, the MFP 1 preserves the received data, by means of the IMH 42 and corresponding hardware parts. Then, after acquiring all of the printing data, the PRINT 11 transmits a printing request to the ECS 25, to proceed to the processes based on the SCS 30 and the SRM 31 in the lower layer, i.e., the service layer LSV. Then, the SRM 31 transmits and receives data, etc., with a hardware part such as the engine 110 via the I/F 52.

Additionally, the data (hereinafter referred to as "output-image-data") that is output to the engine 110 is generated by means of the IMH 42, etc., in response to a user operation or setting. Furthermore, an image represented by data (hereinafter referred to as "embed-data") to be included in the output-image-data is stored by means of a corresponding hardware part, etc., so that the embed-data is retrieved along with generation of output-image-data. Then, at the time of embedding the embed-data in the output-image-data, a processing request is transmitted to the MEU 43. Then, the embed-data is embedded in the output-image-data by means of the MEU 43, etc.

Furthermore, when output-image-data is output to the engine 110, the MFP 1 prints an image represented by the output-image-data on a sheet, etc., by means of the engine 110. Then, the MFP 1 is capable of scanning embed-data from the printed sheet, etc., by means of a scanner, etc. Note that the resolution of scanning needs to be double or more as high as the resolution of embedding, based on the sampling theorem. Thus, an apparatus employed for scanning performs scanning in a resolution that is double or more as high as the resolution of embedding.

<Example of a Functional Configuration>

Figure 3:
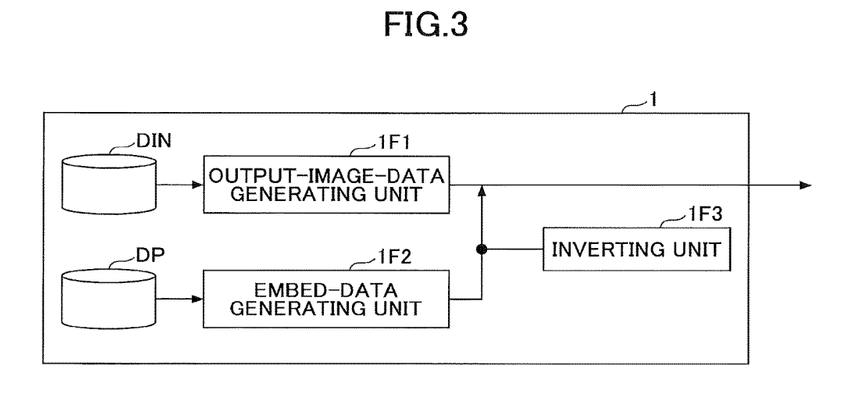
FIG. 3 is a functional block diagram illustrating an example of a functional configuration of the image processing apparatus according to the embodiments of the present invention.

FIG. 3 is a functional block diagram illustrating an example of a functional configuration of the image processing apparatus according to the embodiments of the present invention. For example, the MFP 1 includes an output-image-data generating unit 1F1, an embed-data generating unit 1F2, and an inverting unit 1F3.

The output-image-data generating unit 1F1 embeds embed-data generated by the embed-data generating unit 1F2 in input-image-data DIN, in order to generate output-image-data. The output-image-data generating unit 1F1 is actualized, for example, by the controller 60 (see, FIG. 1).

The embed-data generating unit 1F2 generates embed-data to be included in output-image-data. Additionally, embed-data is generated, based on user information DP, etc., which is preregistered. The embed-data generating unit 1F2 is actualized, for example, by the controller 60 (see, FIG. 1).

The inverting unit 1F3 inverts colors represented by embed-data, based on colors represented by input-image-data and colors represented by embed-data. The inverting unit 1F3 is actualized, for example, by the controller 60 (see, FIG. 1).

<Usage Example of the Image Processing Apparatus>

For example, usage of the MFP 1 may be as follows.

Figure 4:
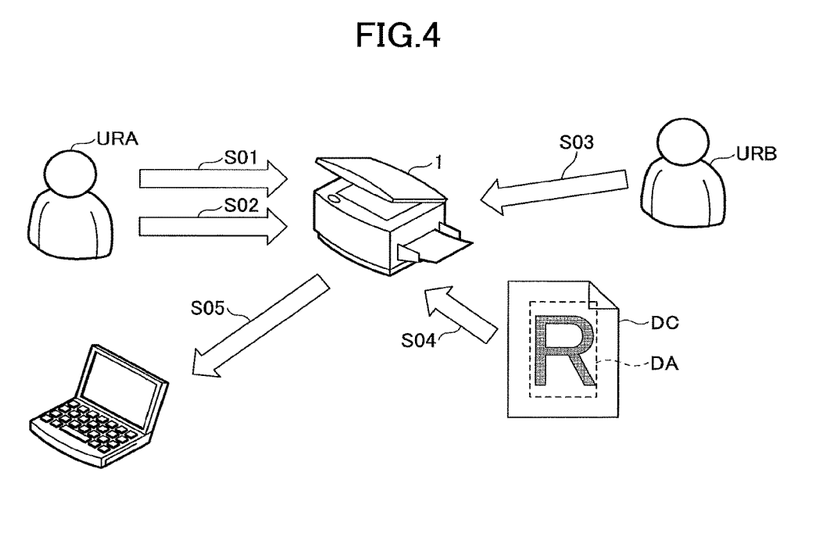
FIG. 4 is a conceptual diagram illustrating a usage example of the image processing apparatus according to the embodiments of the present invention.

FIG. 4 is a conceptual diagram illustrating a usage example of the image processing apparatus according to the embodiments of the present invention. In the following description regarding the illustrated example, there are two individuals: a "user A" URA and a "user B" URB.

At Step S01, the MFP 1 authenticates the "user A" URA. For example, the MFP 1 executes what is termed as user registration of the "user A" URA. Specifically, user information such as letters or numbers for specifying the "user A" URA is registered on the MFP 1, in response to a user operation of the "user A" URA. Note that user information for specifying the "user A" URA may be, for example, a user identification (ID), a user name, a staff number, a user number, or a combination of such information, etc. Here, it is assumed that user information is stored in the MFP 1. Note that, user information may be stored in an external device other than the MFP 1. In such a configuration for authentication, the MFP 1 may request an external device such as a server that stores user information that has been input (e.g. an ID) to make reference to preregistered user information. Furthermore, in the above configuration, the MFP 1 may acquire user information from an external device, as needed.

Then, once the user registration is completed, the "user A" URA is eligible to request the MFP 1 to print or scan an image. That is to say, the "user A" URA is capable of utilizing the MFP 1 after user registration. Note that, in a case that the user registration has already been completed, the "user A" URA is authenticated by the MFP 1 upon entering corresponding user ID, etc.

At Step S02, the MFP 1 inputs data (hereinafter referred to as "input-image-data") that represents an image to be printed on a printed material DC, based on a user operation of the "user A" URA. That is to say, an image represented by the input-image-data, which is input by the "user A" URA, is printed on the printed material DC. Thus, the input-image-data may be, for example, document data representing a document. Then, the MFP 1 generates embed-data DA that represents user information of the "user A" URA, which is registered at Step S01. Then, the MFP 1 performs printing, based on output-image-data including the embed-data DA, so as to produce the printed material DC. Note that methods for generating embed-data and output-image-data are explained below in detail.

Additionally, in the above example, it is assumed that the MFP 1 has been set to perform so-called digital watermark printing (or digital-embed printing), which is to embed embed-data DA representing user information that is associated with the "user A" URA in input-image-data.

In the following description, it is supposed that, after producing a printed material DC at Step S02, the "user A" URA forgot the printed material DC, which remained on the MFP 1, and then the "user B" URB picked up the printed material DC. The following description explains an example of a process and an operation performed by the "user B" URB after picking up the printed material DC.

At Step S03, the MFP 1 authenticates the "user B" URB. The MFP 1 authenticates the "user B" URB, for example, by the same method as in Step S01. Through the step, the "user B" URB is eligible to utilize the MFP 1.

At Step S04, the MFP 1 scans the printed material DC. Specifically, at Step S04, the MFP 1 scans the image printed on the printed material DC by means of a scanner provided on the MFP 1, etc., based on a user operation of the "user B" URB. Then, as the printed material DC was printed out based on the output-image-data to which the embed-data DA is embedded, the MFP 1 detects the user information of the "user A" URA, which is embedded to the image, based on the embed-data DA.

The MFP 1 is capable of reproducing embedded information by scanning a "watermark" that is embedded based on embed-data DA, so as to identify the "user A" URA, based on information stored through user registration. Thus, the MFP 1 is capable of identifying the "user A" URA by scanning the printed material DC, based on the embed-data DA.

At Step S05, the MFP 1 transmits, for example, notification to alert the "user A" URA. For example, in a case that an email address, etc., is registered as user information, the MFP 1 transmits, to the email address of the "user A" URA, a message, etc., indicating that the printed material DC was left at the MFP 1. Note that a method for the notification may be a push notification, etc., instead of an email. Furthermore, notified contents may be, for example, an apparatus name for specifying the MFP 1, a location of the MFP 1, time/date information, a printed content for specifying the printed material DC, or a combination of such information.

Furthermore, for example, an administrator who has administrative privileges, instead of the "user B" URB, may trace the "user A" URA. Note that an administrator, etc., may have superior authority over the "user A" URA and the "user B" URB.

Furthermore, the MFP 1 has an "embed-data detecting mode", which enables the "user B" URB to trace the "user A" URA through Steps S04 and S05 in the above example. Note that the MFP 1 may be set to the embed-data detecting mode, for example, through a job setting screen at the time of performing a scan.

<Example of Overall Processing>

Figure 5:
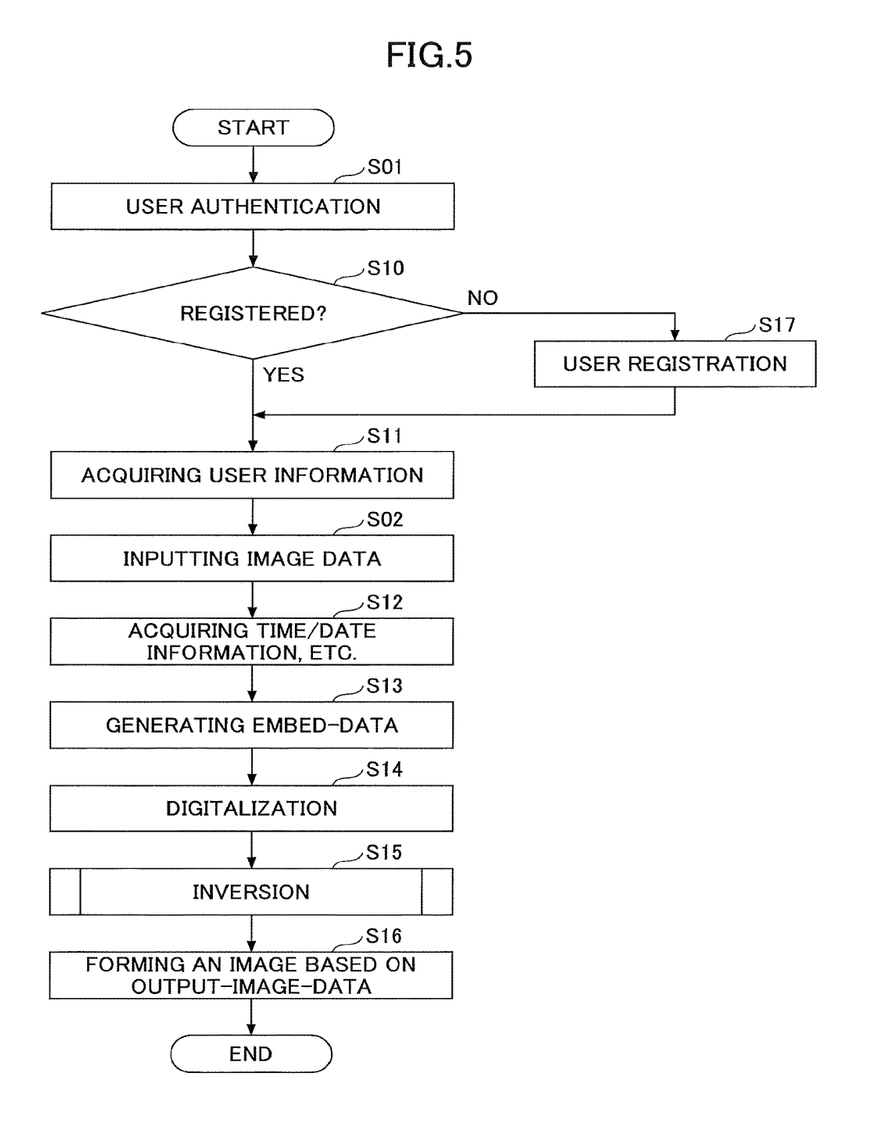
FIG. 5 is a flowchart illustrating an example of overall processing performed by the image processing apparatus according to the embodiments of the present invention.

FIG. 5 is a flowchart illustrating an example of overall processing performed by the image processing apparatus according to the embodiments of the present invention. Note that the same processes as in FIG. 4 are assigned the same reference signs, so as to omit detailed explanation in FIG. 5.

At Step S01, the MFP 1 authenticates the "user A" URA.

At Step S10, the MFP 1 determines whether the "user A" URA is a registered user. Specifically, at Step S01, a user ID, etc., of the "user A" URA is input to the MFP 1 through a user operation of the "user A" URA. Then, for example, the MFP 1 searches for the input user ID among registered IDs, in order to determine whether the "user A" URA is a registered user.

Then, in a case that the MFP 1 determines that the "user A" URA is registered (YES at Step S10), the MFP 1 proceeds to Step S11. Contrarily, in a case that the MFP 1 determines that the "user A" URA is not registered (NO at Step S10), the MFP 1 proceeds to Step S17.

At Step S11, the MFP 1 acquires user information. That is to say, at Step S11, the MFP 1 retrieves user information stored in the MFP 1. Note that the acquired user information includes information to be embedded as embed-data DA.

Among user information, types of information to be embedded as embed-data DA may be predetermined, based on a setting, a model, etc.

At Step S02, the MFP 1 inputs image data.

At Step S12, the MFP 1 acquires time/date information, etc. For example, in a case that time/date information is included in embed-data, the MFP 1 acquires, at Step S12, time/date information of authentication to be embedded. Furthermore, information acquired at Step S12 is not limited to time/date information, and the MFP 1 may acquire other types of information.

At Step S13, the MFP 1 generates embed-data. Specifically, the MFP 1 generates embed-data, based on information acquired at Step S12, information stored through user registration, etc. For example, embed-data may be data indicating a user ID, a user name, time/date, etc.

At Step S14, the MFP 1 digitalizes the embed-data. In other words, at Step S14, the MFP 1 converts the embed-data into a series of multiple bits (i.e. data indicating "1" or "0"). For example, data digitalized into "1" is printed out to be a black dot in an image. Contrarily, data digitalized into "0" is printed out to be a white dot in an image. Thus, through digitalization, the embed-data is converted into data representing a collection of black dots and white dots. Additionally, along with digitalization, processing such as optimization may be performed, in order to minimize data size.

At Step S15, the MFP 1 executes inverting processing for inverting the embed-data. For example, inverting processing is as follows.

Figure 6:
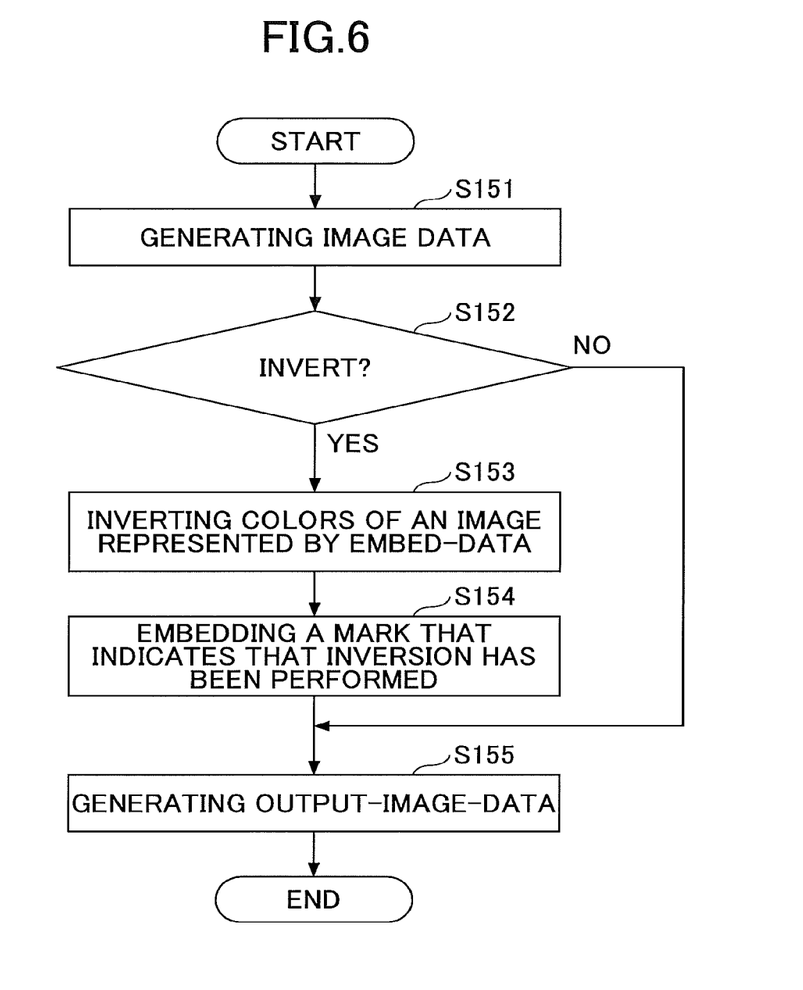
FIG. 6 is a flowchart illustrating an example of inverting processing performed by the image processing apparatus according to the embodiments of the present invention.

FIG. 6 is a flowchart illustrating an example of inverting processing performed by the image processing apparatus according to the embodiments of the present invention. The processing illustrated is an example of processing performed at Step S15 in FIG. 5.

At Step 5151, the MFP 1 generates image data. Specifically, the MFP 1 generates image data which is in a printable format of the MFP 1, based on input-image-data. Furthermore, at Step S151, the MFP converts the input-image-data into a proper or suitable format for performing determination processing at following Step S152, etc. Furthermore, the MFP 1 produces the image data based on the data digitalized at Step S14 (see, FIG. 5).

At Step S152, the MFP 1 determines whether to invert the embed-data. Specifically, in order to determine whether to invert the embed-data, the MFP 1 compares a color (hereinafter referred to as a "first color") represented in the input-image-data and a color (hereinafter referred to as a "second color") represented in the embed-data. More specifically the MFP 1 first counts the number of data representing the second color (i.e. a color represented in the image generated at Step S14), which is either one of black or white. Note that the second color is a color included in the image represented by the embed-data in the largest proportion. For example, the MFP 1 may count the number of data representing black, if black is the second color. Contrarily, the MFP 1 counts the number of data representing a color that is different from the second color as the first color (i.e. a color represented in the input-image-data). In the above example, the MFP 1 counts the number of data representing white as the first color.

In the following description, the number of data representing the first color, which is counted by the MFP 1, is referred to as a "first value". Additionally, the number of data representing the second color, which is counted by the MFP 1, is referred to as a "second value". Note that the number of data representing black may be counted as a first value. In the case that the number of data representing black is counted as a first value, the number of data representing white is counted as a second value. That is to say, data representing a color counted for a first value and data representing a color counted for a second value represent inversed colors.

Additionally, in the above explanation, a first value and a second value are obtained by counting the absolute numbers of data representing respective colors included in input-image-data and embed-data, which is effective mainly in a case that input-image-data and embed-data are the same size (e.g. the same number of pixels). Furthermore, in a case that input-image-data and embed-data are different sizes, etc., the image processing apparatus according to the embodiments of the present invention may obtain a first value and a second value, based on proportions of data representing respective colors in the input-image-data and the embed-data.

Additionally, to obtain a first value or a second value, the number of data representing a color may be counted, for example, on a pixel basis. Note that a unit for counting the number of data representing a color is not limited to a pixel; the number of data representing a color may be counted on a dot basis or on another predetermined unit basis.

Additionally, the number of data representing a color may be counted, for example, for an image as an entire region. Note that the region of counting the number of data representing a color may also be restricted to a region in which an image represented by the embed-data is embedded.

Then, for example, in a case that the first value is equal to or greater than a half of the second value, the MFP 1 determines to invert colors of the image represented by the embed-data (YES at Step S152). That is to say, the MFP 1 determines whether data representing a region, in which the embed-data is to be embedded, includes a large number of data representing the inverted color of the second color, in order to avoid, for example, a white color to outstandingly appear in a region including a large amount of black. Thus, the MFP 1 compares the numbers of data representing colors, based on the first value and the second value, in order to determine whether an image represented by embed-data is to be overly perceptible when embedded.

Then, in a case that the MFP 1 determines to invert the colors of the image represented by the embed-data (YES at Step S152), the MFP 1 proceeds to Step S153. Contrarily, in a case that the MFP 1 determines not to invert the colors of the image represented by the embed-data (NO at Step S152), the MFP 1 proceeds to Step S155.

At Step S153, the MFP 1 inverts the colors of the image represented by the embed-data. Specifically, at Step S153, the MFP 1 converts black into white and converts white into black with respect to colors of the image represented by the embed-data. In such a way, the MFP 1 converts colors represented by the digitalized embed-data into inverted colors.

At Step S154, the MFP 1 embeds a mark that indicates that colors have been inverted (hereinafter simply referred to as a "mark"). The mark is embedded at a predetermined position. For example, in a case that embed-data is embedded to form a circle, the MFP 1 embeds the mark at the center position, etc., of the circle formed by the embed-data. By having the mark at such a position, the MFP is capable of estimating a position of the mark in the embed-data detecting mode, which enables the MFP 1 to detect the mark with high accuracy. Note that a specific example of a case that a mark is embedded is explained in the following description.

At Step S155, the MFP 1 generates output-image-data. For example, in a case that the embed-data is embedded to form a circle and the mark is embedded in the center point of the embed-data, then output-image-data is as described below.

Figure 7:
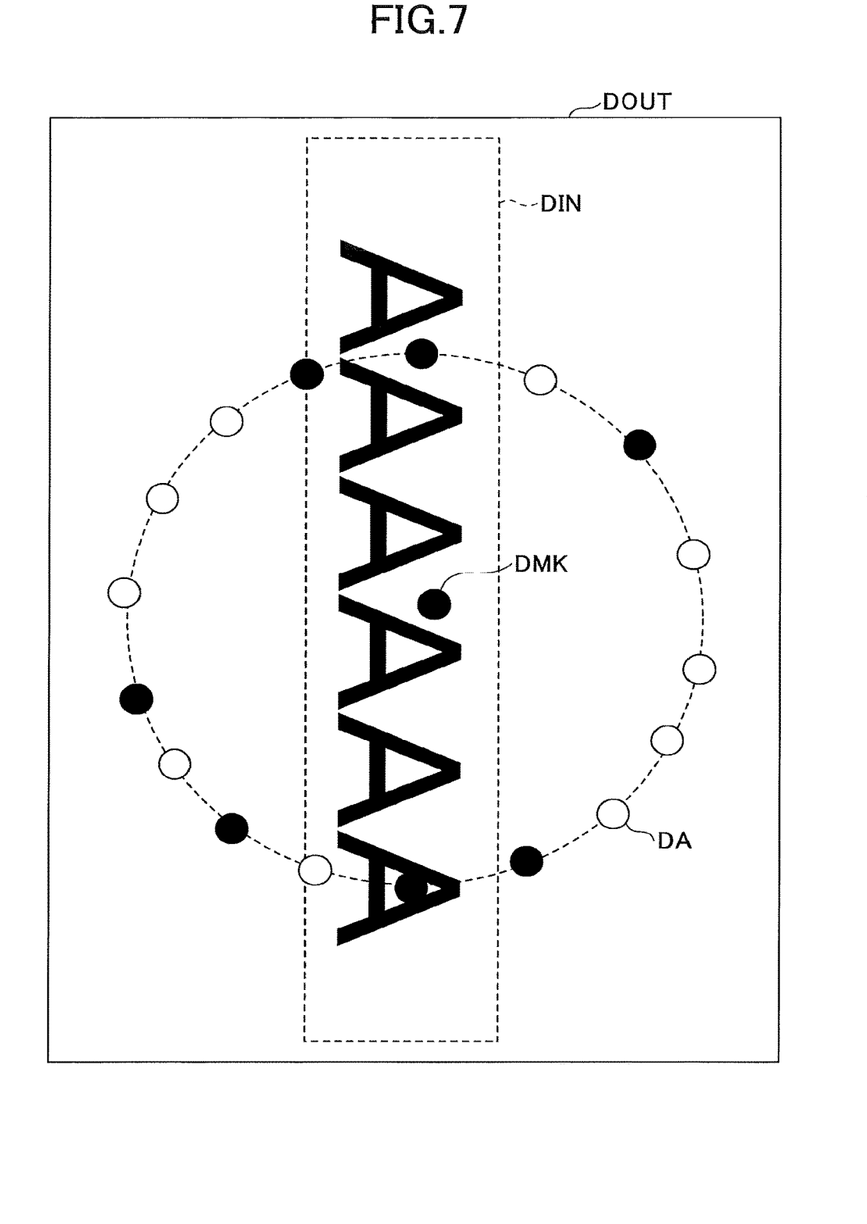
FIG. 7 is a drawing illustrating an example of a processing result of the image processing apparatus according to the embodiments of the present invention.

FIG. 7 is a drawing illustrating an example of a processing result of the image processing apparatus according to the embodiments of the present invention. The illustrated example explains a case in which output-image-data DOUT is generated from input-image-data DIN. Specifically, in order to generate the output-image-data DOUT, the input-image-data DIN is input (Step S02). Then, in order to generate the output-image-data DOUT, the embed-data DA is embedded to form a circle, as illustrated. Furthermore, in the illustrated example, a mark DMK is embedded at the center point of the circle formed by the embed-data DA (Step S154).

Note that, in FIG. 7, a color of the mark DMK and each color in the embed-data DA are indicated as white through a white dot, and are indicated as black through a black dot. Furthermore, for example, in a case that the mark DMK is illustrated with a black dot, it is indicated that the inversion has been performed (YES at Step S152). Contrarily, in a case that the mark DMK is illustrated with a white dot, it is indicated that the inversion has not been performed (NO at Step S152). Note that having a black dot for the mark DMK may be associated with indicating being inverted through a preset setting. Therefore, through another setting, having a white dot for the mark DMK may also be associated with indicating being inverted. In such a way, the MFP 1 is capable of determining whether the embed-data DA has been inverted, based on the mark DMK. Therefore, in the embed-data detecting mode, in a case of determining that the embed-data DA has been inverted, the MFP 1 inverts the scanned embed-data DA for reproducing embedded information. Contrarily, in the embed-data detecting mode, in a case of determining that the embed-data DA has not been inverted, the MFP 1 does not invert the scanned embed-data DA for reproducing embedded information.

Furthermore, as illustrated, in a case of embedding the embed-data DA, based on a comparison of the amounts of data representing colors according to the first value and the second value, it is more likely that the embed-data DA is embedded to be less perceptible. Specifically, as illustrated, in a case of embedding the embed-data DA in data representing a region including a large amount of white, the embed-data DA is converted to increase the number of data representing white. That is to say, in a case that the embed-data DA includes a large amount of data representing black, the MFP 1 inverts the embed-data DA, so that the embed-data DA includes a large amount of data representing white.

Contrarily, in a case that the embed-data DA includes a large amount of data representing white, the MFP 1 does not invert the embed-data DA, so that the embed-data DA remains as is to include a large amount of data representing white. In such a way, the embed-data DA representing a large amount of white is embedded in data representing a region including a large amount of white, and therefore, an image corresponding to the embed-data DA may be printed out to be less perceptible. Thus, the MFP 1 is capable of printing an image in a way that the additionally embedded image that corresponds to the embed-data DA is less perceptible in the printed image. Therefore, the MFP 1 is capable of forming an image including an additionally embedded image corresponding to the embed-data DA for an improved image quality.

Note that the embed-data DA is not necessarily embedded to form a circle, and may be embedded to form another predetermined shape. Furthermore, the mark DMK is not necessarily embedded at a center point, and may be embedded at another preset predetermined position.

Returning to FIG. 5, at Step S16, the MFP 1 forms an image, based on output-image-data. That is to say, the MFP 1 prints an image as illustrated in FIG. 7 on a sheet, etc. Embedded information may be retrieved from a printed material obtained in such a way, in the embed-data detecting mode, i.e., through the Steps S03, S04, and S05 as illustrated in FIG. 4.

At Step S17, the MFP 1 performs user registration. For example, through user registration, a user ID, etc., of a user to be registered is input. Furthermore, through user registration, a photo of a user, etc., may be registered. Additionally, a photo may be taken by an image-capturing unit provided on the MFP 1, or image data representing a photo may be received by the MFP 1 via email, etc.

<Second Embodiment>

In the second embodiment, for example, an MFP having the same hardware and software configurations as in the first embodiment may be employed. The following description explains an example where the same MFP 1 as in the first embodiment is employed, so as to omit duplicated explanations of the hardware and software configurations. The second embodiment differs from the first embodiment in terms of inverting processing. The following description mainly explains differences.

Figure 8:
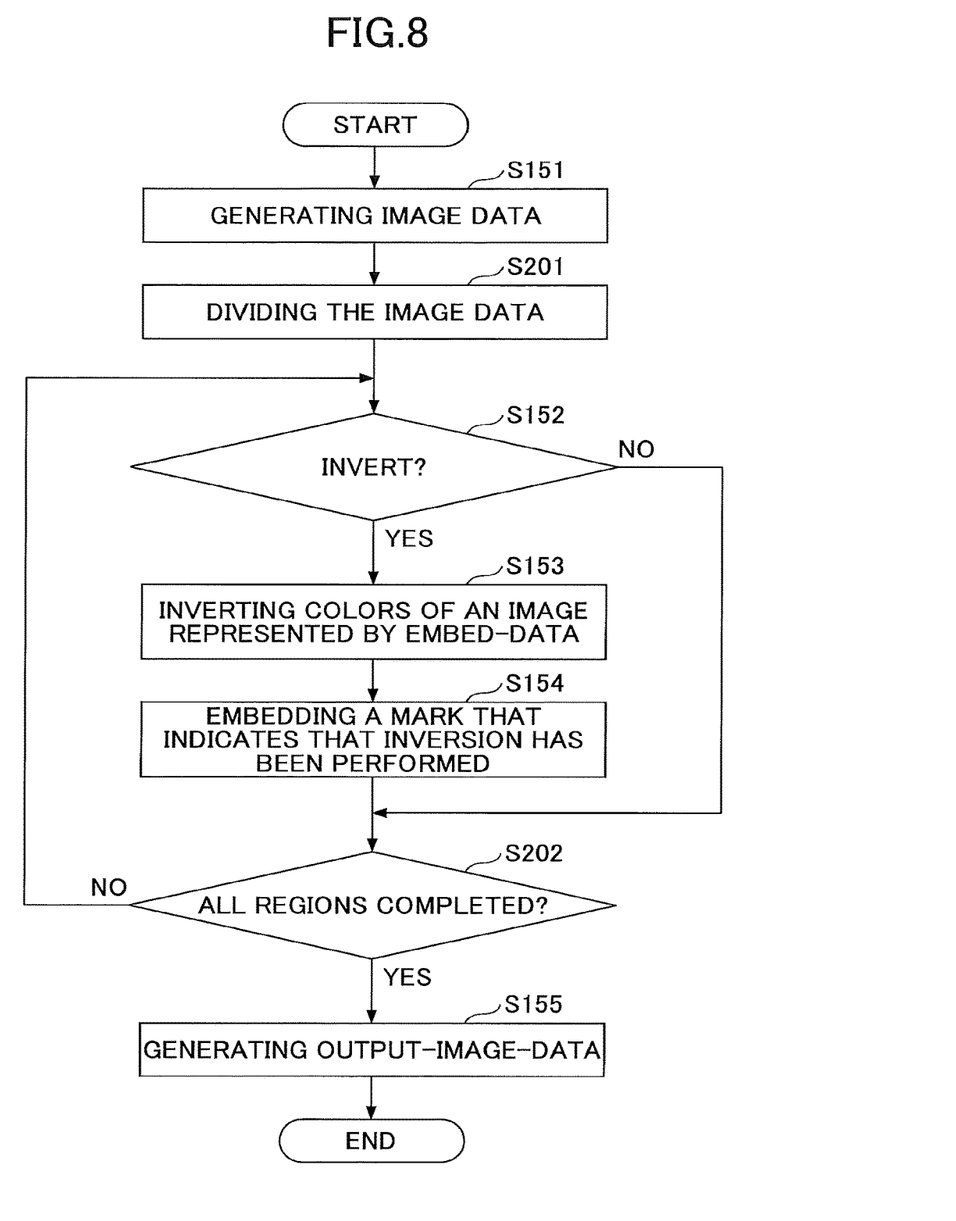
FIG. 8 is a flowchart illustrating an example of inverting processing performed by the image processing apparatus according to a second embodiment of the present invention.

FIG. 8 is a flowchart illustrating an example of inverting processing according to the second embodiment, which is performed by the image processing apparatus according to the embodiments of the present invention. FIG. 8 differs from FIG. 6 in terms of additional Steps S201 and S202. In the following description, the same processes as in FIG. 6 are assigned the same reference signs, so as to omit duplicated explanations.

At Step S201, the MFP 1 divides image data. For example, the MFP 1 divides image data in a following manner. Note that a dividing unit for dividing image data may be actualized by the controller 60 (see, FIG. 1), etc.

Figure 9:
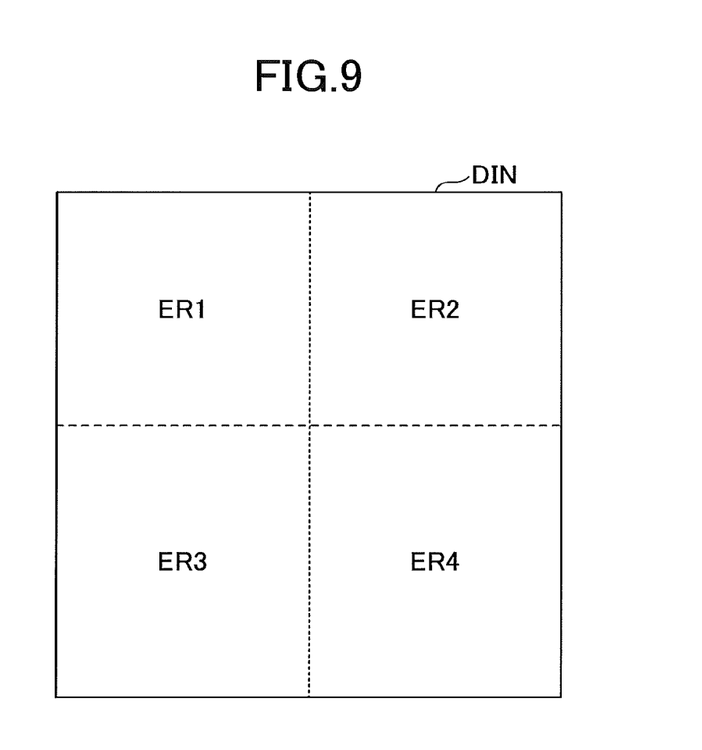
FIG. 9 is a drawing illustrating an example of dividing processing performed by the image processing apparatus according to the second embodiment of the present invention.

FIG. 9 is a drawing illustrating an example of dividing processing performed by the image processing apparatus according to the embodiments of the present invention. In the illustrated example, a region represented by the input-image-data DIN is divided into four regions (hereinafter referred to as "divided regions"). Specifically, the MFP 1 divides the input-image-data DIN into data representing a first divided region ER1, data representing a second divided region ER2, data representing a third divided region ER3, and data representing a fourth divided region ER4. Note that the number of divided regions is not limited to four; the MFP 1 only needs to divide into multiple divided regions. For example, the number of divided regions may be 2, 8, 16, etc. Further, an odd number, such as 3 or 5, of divided regions may be possible.

Furthermore, among the steps illustrated in FIG. 8, Steps S152 through S154 are performed repeatedly for each of divided regions. That is to say, determination whether to perform inversion, etc., is performed with respect to each of the divided regions, so that the MFP 1 inverts the embed-data, which is to be embedded in each of the divided regions, based on a determination result with respect to each of the divided regions.

At Step S202, the MFP 1 determines whether processing has been completed with respect to all regions. Specifically, in the example of FIG. 9, the MFP 1 determines whether determination for inversion has been performed with respect to all of the first divided region ER1, the second divided region ER2, the third divided region ER3, and the fourth divided region ER4.

Then, in a case that the MFP 1 determines that processing has been performed with respect to all regions (YES at Step S202), the MFP 1 proceeds to Step S155. Contrarily, in a case that the MFP 1 determines that processing has not been performed with respect to all regions (NO at Step S202), the MFP 1 proceeds to Step S152.

After the dividing processing is performed, embed-data is embedded in each of the divided regions. Specifically, in a case that there are four divided regions as illustrated in FIG. 9, each of four embed-data DA is embedded to form a circle, as illustrated in FIG. 7.

As inversion is performed with respect to each of divided regions in such a manner, the MFP 1 is capable of embedding embed-data to be less perceptible, even in the case of the embed-data representing an image with an unbalanced color distribution such as an image including a large amount of black in a partial region. Specifically, the MFP 1 embeds embed-data including a large amount of data representing black into data representing a divided region including a large amount of black. Contrarily, the MFP 1 embeds embed-data including a large amount of data representing white into data representing a divided region including a large amount of white. In such a manner, the MFP 1 is capable of embedding embed-data to be less perceptible, so as to improve image quality.

Additionally, the number of divided regions is preferred to be larger. With a large number of divided regions, the MFP 1 is capable of determining whether to perform inversion with respect to detailed regions, and therefore capable of embedding embed-data to be less perceptible. Furthermore, in a case that the MFP 1 embeds a mark in each of divided regions, the MFP 1 is capable of determining whether inversion has been performed with respect to each of the divided regions.

Note that a black color may not be necessarily pure black. For example, pure black is represented by a value of "0" among 8-bit values (i.e. values of "255" through "0", where darkness increases as values become lower. Additionally, a black color according to the present invention may be represented by a value that is equal to or smaller than a predetermined value among 8-bit values. For example, a black color according to the present invention may be represented by a value that is equal to or smaller than "10" among 8-bit values. Similarly, a white color may not be necessarily pure white. For example, pure white is represented by a value of "255" among 8-bit values. For example, a white color according to the present invention may be represented by a value that is equal to or greater than "240" among 8-bit values.

Furthermore, in the process of inverting a white color into a black color, a white color may be inverted into a color represented by a value that is equal to or smaller than a predetermined value. Similarly, in the process of inverting a black color into a white color, a black color may be inverted into a color represented by a value that is equal to or greater than a predetermined value.

Additionally, the above examples present configurations separated based on main functions for ease of comprehension of processing. Therefore, with respect to the embodiments of the present invention, the manner in which processes are separated and names of separated processes are not limited to as presented. For example, the processing may be divided into more detailed processes, depending on an amount of processing. Alternatively, the processing may be divided into broader processes, so that each process includes more processes.

Furthermore, the image processing apparatus may not necessarily be configured by a single device. That is to say, the embodiments of the present invention may be actualized by an image processing system including one or more information processing apparatuses. Note that such information processing apparatuses or an information processing system may perform processing in a manner such that the entirety or parts of each process is/are separated, broadened, paralleled, or combined.

Note that the entirety or parts of processing according to the present invention may be actualized by a program written in a programming language, etc., which causes a computer to execute an image processing method. In other words, such a program may be a computer program for causing a computer such as an image processing apparatus to execute an image processing method.

Furthermore, such a program may be distributed via a recording medium such as a flash memory, a flexible disk, an optical disk, a secure digital (SG) card (registered trademark), or a magneto-optical (MO) disk. Furthermore, such a program may be distributed via an electronic communication line.

Further, the present invention is not limited to these embodiments, but various variations and modifications may be made without departing from the scope of the present invention.

What is claimed is:

1. An image processing apparatus comprising:
   an embed-data generating unit configured to generate embed-data, which is to be embedded in input-image-data, the input-image-data representing a first image including a first color, the embed-data representing a second image including a second color;
   an inverting unit configured to invert the second image represented by the embed-data in response to a determination that a predetermined condition relating to the first color and the second color is met; and
   an output-image-data generating unit configured to generate output-image-data as a third image, the output-image-data including the input-image-data representing the first image with the embed-data embedded in input-image-data, wherein
   (i) in response to the determination that the predetermined condition is met, the embed-data in the third image represents the second image that is inverted by the inverting unit and (ii) in response to the determination that the predetermined condition is not met, the embed-data in the third image represents the second image that is not inverted by the inverting unit, and
   wherein the embed-data is embedded in the input-image-data to form a circle with a mark embedded in a center point of the circle, the mark indicating whether the second color has been inverted.

2. The image processing apparatus according to claim 1, wherein the first color is either one of black or white and the second color is another one of black or white, and wherein the inverting unit determines whether to invert the second image represented by the embed-data, based on a first value and a second value, the first value indicating the number of data representing the first color, the second value indicating the number of data representing the second color.

3. The image processing apparatus according to claim 2, wherein the the predetermined condition specifies that the first value is equal to or greater than a half of the second value.

4. The image processing apparatus according to claim 1, further comprising a dividing unit configured to divide the first image represented by the input-image-data into a plurality of divided regions,
   wherein the second image represented by the embed-data is embedded in each of the plurality of divided regions,
   wherein the inverting unit determines, with respect to each of the plurality of divided regions, whether to invert the second image represented by the corresponding embed-data.

5. A method for processing an image, the method being executed by an image processing apparatus, the method comprising:
   generating embed-data, which is to be embedded in input-image-data, the input-image-data representing a first image including a first color, the embed-data representing a second image including a second color;
   inverting the second image represented by the embed-data in response to a determination that a predetermined condition relating to the first color and the second color is met; and
   generating output-image-data as a third image, the output-image-data including the input-image-data representing the first image with the embed-data embedded in input-image-data, wherein
   (i) in response to the determination that the predetermined condition is met, the embed-data represents the second image that is inverted, and (ii) in response to the determination that the predetermined condition is not met, the embed-data represents the second image that is not inverted, and
   wherein the embed-data is embedded in the input-image-data to form a circle with a mark embedded in a center point of the circle, the mark indicating whether the second color has been inverted.

6. A non-transitory recording medium storing a program for causing a computer to execute an image processing method, the method comprising:
   generating embed-data, which is to be embedded in input-image-data, the input-image-data representing a first image including a first color, the embed-data representing a second image including a second color;
   inverting the second image represented by the embed-data in response to a determination that a predetermined condition relating to the first color and the second color is met; and
   generating output-image-data as a third image, the output-image-data including the input-image-data representing the first image with the embed-data embedded in input-image-data, wherein
   (i) in response to the determination that the predetermined condition is met, the embed-data in the third image represents the second image that is inverted, and (ii) in response to the determination that the predetermined condition is not met, the embed-data in the third image represents the second image that is not inverted, and
   wherein the embed-data is embedded in the input-image-data to form a circle with a mark embedded in a center point of the circle, the mark indicating whether the second color has been inverted.

* * * * *